UNITED STATES PATENT OFFICE 2,124,530

METHOD OF TREATING WELLS

Albert G. Loomis and Harold T. Byck, Berkeley, and James F. Fidiam, Jr., San Francisco, Calif., assignors to Shell Development Company, San Francisco, Calif., a corporation of Delaware No Drawing. Application June 20, 1936, Serial No. 86,342

9 Claims. (Cl. 166—21)

This invention pertains to methods for increasing the production of oil and gas wells, and more particularly of wells which fail to respond to conventional acidizing treatments such, for example, as treatment with hydrochloric acid.

A decrease in the production of a well is in many cases due not to an actual exhaustion of the oil reservoir, but to the accumulation of clogging matter on the walls, casing, tubing, etc. of the well as well as in the pores, crevices, capillaries and flow channels of the adjoining formation.

This obstructing solid matter may be of mineral origin, being, for example, due to the precipitation of mineral deposits from formation waters, or may be of a waxy, gummy or asphaltic nature, consisting, for example, of paraffin wax, resins, asphaltenes, carbenes and carboids.

A particularly difficult case for treatment is presented by wells in which the clogging deposits consists of a mixture of organic and mineral matter, such, for example, as asphalt or an asphaltic substance mixed with minerals such as shale, calcium and magnesium carbonates, silica, etc.

An analysis of some of such material taken, for example, from a well in the Santa Maria field in California, showed it to be mostly calcium carbonate, with smaller percentages of magnesium carbonate and silica, mixed and cemented with extractable organic matter consisting of asphalt, wax and oil, this mixture being known as gyp. Gyp deposits appear to consist of two distinct layers: a relatively thin outside layer containing carbonates and other salts, but substantially no organic matter, and a thick layer containing organic matter mixed with inorganic constituents. Undoubtedly the carbonates form as a result of the loss of carbon dioxide from the fluid as it flows into the well, the pressure drop converting bicarbonates to normal carbonates; at the same time the solid carbonates become intimately mixed with oil, wax and asphalt.

Gyp deposits are formed not only on the walls of the well, casing, tubing, pumps, etc., but also within the formation, at least in the zone of the greatest pressure drop as the fluid flows into the well.

It has been shown by experience that conventional methods of well treatment are ineffective against gyp deposits.

For example, treatment with hydrochloric acid results in a very slow and incomplete solution of gyp. In the darker, thicker layer described above, the carbonate crystals are protected against the action of the acid by the acid-insoluble organic matter; moreover an acid-insoluble semi-solid sticky mass is left after the treatment to plug the formation and the tubing perforations.

In a similar manner, non-aqueous solvents, such as gasoline, benzol, etc., are ineffective against gyp deposits owing to the protective action of the carbonate layers against the solvent.

It has now been found that mineral-organic deposits can be very rapidly and effectively removed according to the process of this invention by lowering into a well, and, if necessary, forcing into the adjoining formation by applying pressure, an aqueous solution of a strong acid and an organic solvent in which said acid is substantially insoluble, and subjecting said deposits to the simultaneous action of these agents, or to the alternating action of such acid and solvent following each other in relatively quick succession.

Tests have shown that mineral-organic deposits react much more rapidly with acid if an organic solvent in which the acid is not soluble is present to act as a promoter. The action of such solvent apparently consists in dissolving the asphalt of the constituents of the organic content of the deposits, thus exposing the mineral portion of the deposits, partially carbonates, to the attack by acid, thus greatly accelerating the reaction rate of the acid with such deposits.

Although it has been known to treat formations obstructed by deposits by means of aqueous acids or solutions of such acids with certain water-soluble organic solvents, these known processes possess considerable disadvantages. First, water-soluble organic solvents capable of reacting with the organic components of the obstructing deposits are manufactured synthetically and command a price which makes their use prohibitive in treating formations. Second, these solvents, on becoming diluted with the aqueous acid, lose to a considerable extent their solvent powers with regard to the organic components of the obstructing deposits, so that the rate of treating reaction is considerably decreased, and in some cases the treatment cannot be carried out to completion.

The present invention, by making use of water-insoluble organic solvents in combination with aqueous acids, makes available for well-treating purposes a large number of relatively cheap natural organic solvents whose solvent powers are not decreased by dilution with the aqueous acid, and which, when used with suitable acids, are capable of effecting a complete removal of obstructing deposits at a considerably higher rate than by the use of any other known method, as will be seen from the data given below.

In using the present process more specifically for the removal of gyp scale accumulated on the walls of the well, on the casing, tubing, etc., the solvent should preferably be introduced first into the well in order to dissolve surface layers of oil, wax asphalt, etc. It is then followed by the acid, which is usually of greater specific gravity than the solvent. Particularly good results will be obtained by exposing the gyp alternately to the solvent actions of the acid and of the solvent. This may be done by lowering the treating agent into the well in the form of alternate slugs of acid and solvent, and by agitating it with air, gas or by mechanical means known to the art. When the reaction is complete, the mineral matter will be substantially in solution in the aqueous layer, for example, as soluble chlorides, if hydrochloric acid is used, while the wax, asphalt and asphaltic material will be completely in solution in the non-aqueous phase, or partially in solution and partially suspended in the non-aqueous phase, depending on whether the non-aqueous solvent used dissolves all the asphaltic constituents or not. For example, benzol will effect practically complete solution, while gasoline will effect partial solution and partial suspension. In any case, the treating liquids together with the dissolved or suspended disintegrated obstructing matter can be removed after the reaction has taken place by pumping, bailing or in other ways known to the art.

As a specific example of treating applied to a low pressure well, all fluid standing in the hole is first pumped out or otherwise removed. 100 gallons of benzol are introduced into the well either through the tubing or the casing. After allowing the benzol to remain in contact with the gyp scale for about 5 minutes, 100 gallons of the inhibited 15% of hydrochloric acid are introduced into the well through the tubing, care being taken to prevent the acid from coming into contact with the casing seat. At about 5 minutes' intervals the fluid in the bottom of the hole is agitated by means of air or gas or in other ways known to the art. At the end of 30 minutes the fluid is removed from the hole by means of the pump or by a bailer or in other ways known to the art. The well is then put on production and produces at an increased rate, the increase resulting from the removal of gyp scale from formation face, tubing, casing, screens and other equipment of the well.

In many cases, however, where not only the walls of the well, casing, tubing, etc., but also the crevices, pores, flow channels and capillaries of the adjoining formation are clogged by gyp deposits accumulating therein, the treatment of wells with an agent merely introduced into the well is ineffective, unless said agent is forced into the formation itself, wherein a reaction with the obstructing deposits is allowed to take place, with subsequent flushing of the liquid agent and the dissolved deposits from the formation.

In such cases, therefore, it becomes necessary not only to wash the face of the well, casing, tubing, etc., with a treating agent, as described above, but to force said agent into the formation. This can be effected in various ways. For example, the desired amount of organic solvent may be run into the well by gravity through the tubing with the casing head open during this process. Air or gas may now be pumped into the tubing and casing simultaneously to force the solvent into the formation, after which a similar operation is performed with a charge of acid, and then again with a charge of solvent, etc., until the total desired amount of solvent and of acid has been forced into the formation.

It is also possible to run all the solvent and the acid into the tubing in the form of alternate slugs, and then to apply pressure by pumping air, gas or a liquid such as water, oil, etc., to force them into the formation. After the treating agent has remained in the formation for a desired period of time, the formation is flushed by pumping or swabbing. If it is desired to apply pressure only to the tubing, a packer may be installed in the casing above the formation to be treated, to prevent the liquid from rising in the casing, and to direct the treating agent into the desired formation.

When solvents of density greater than oil are used, the casing and tubing may be preloaded with oil, as in normal acid treatment. The solvent and acid are pumped down the tubing in alternate slugs, and are followed by a sufficient quantity of oil to clear the tubing and to force the treating mixture into the formation.

In the case of high pressure wells, it is first necessary to kill the well with oil, after which the treatment may proceed as described above. In a specific example of the present method applied to a low pressure well, the tubing was first pulled out and the well cleaned out. The pay formation had been penetrated from 2955 feet to 2969 feet, the casing being cemented at 2920 feet. A packer was set at 2950 feet. 50 gallons of benzol were then pumped down, followed by 50 gallons of acid, which were again followed by another 50 gallons of benzol, etc., until a total charge of 1000 gallons of benzol and of 1000 gallons of acid had been introduced into the well. Approximately 25 barrels of oil were then pumped into the tubing to clear the latter and to force the solvent and the acid into the formation. The well was then shut in and allowed to stand for three hours, although a longer time may be sometimes required. At the end of this time the pumping equipment was replaced in the tubing and pumping resumed. The liquid brought up by the pump consisted of oil admixed with water containing chlorides in solution, and with benzol containing considerable quantities of asphalt in solution. The productivity of the well was increased more than 10 times as a result of this treatment.

With regard to acids suitable for the purposes of this invention, any aqueous organic or inorganic acid, capable of attacking the carbonate component of the gyp deposits may be used, such, for example, as hydrochloric, hydrobromic, hydrofluoric, nitric, sulfuric, pyrosulfuric, phosphoric, pyrophosphoric, chloracetic and chlorsulfonic acids. Any desired inhibitors may be used with these acids to prevent corrosion of the equipment.

Since the method of the present invention is especially effective when the obstructing deposits are subjected to the alternate action of the aqueous acid and the solvent, it is preferable to use these acids in combination with solvents with which they are relatively immiscible, for example, benzol, gasoline, naphtha, kerosene, petroleum ether, pyridine, toluene, chlorinated hydrocarbons such as carbon disulfide, carbon tetrachloride, etc. Any mixture of the above acids and solvents can obviously also be used. When using hydrocarbon mixtures such as gasoline or naphtha, especially good results are obtained if such mixtures are rich in aromatics, for example, when they contain at least 30% of the latter. The acid should preferably not form emulsions with the solvents, since the effectiveness of the process is decreased in such cases, and considerable difficulties are met in forcing the emulsion into the formation.

The tremendous increase in the rate of solution of gyp deposits in a treating agent consisting of hydrochloric acid plus an equal volume of a nonaqueous solvent present as a separate phase, as compared with the rate of solution of the same deposits in hydrochloric acid alone, may be seen from the following tables. In each of the cases listed, the samples, taken from an oil well, consisted of four cubes of scale of approximately 1 cm. edge, and had therefore the same weight and the same area of exposure to the attack of the acid. The rate of reaction was measured by the cc. of carbon dioxide gas evolved in a certain length of time. The temperature was 20° C. and the pressure normal in each case.

TABLE I

Rate of reaction of gyp deposits with two-component agents

| Reagent | | | | Time in seconds | $CO_2$ evolved in c. c. |
|---|---|---|---|---|---|
| Acid | Quantity in c. c. | Solvent | Quantity in c. c. | | |
| 15% HCL | 25 | None | | 20 | 45 |
| 15% HCL | 25 | ---do--- | | 30 | 60 |
| 15% HCL | 25 | ---do--- | | 40 | 75 |
| 15% HCL | 25 | ---do--- | | 60 | 100 |
| 15% HCL | 25 | ---do--- | | 90 | 130 |
| 15% HCL | 25 | Benzol | 25 | 10 | 130 |
| 15% HCL | 25 | ---do--- | 25 | 20 | 275 |
| 15% HCL | 25 | ---do--- | 25 | 30 | 390 |
| 15% HCL | 25 | ---do--- | 25 | 40 | 470 |
| 15% HCL | 25 | ---do--- | 25 | 50 | 515 |
| 15% HCL | 25 | ---do--- | 25 | 60 | 550 |
| 15% HCL | 25 | Gasoline | 25 | 20 | 50 |
| 15% HCL | 25 | ---do--- | 25 | 40 | 200 |
| 15% HCL | 25 | ---do--- | 25 | 60 | 390 |
| 15% HCL | 25 | ---do--- | 25 | 80 | 565 |
| 15% HCL | 25 | ---do--- | 25 | 90 | 640 |

The data show that the action of hydrochloric acid, when used with gasoline or benzol as a promoter, is from about 4 to 5 times more effective in dissolving mineral-organic deposits than when used alone.

Furthermore, it is very advantageous in many cases to use a three-component treating agent comprising an aqueous acid, a solvent immiscible therewith, and a second solvent which is readily soluble in both the acid and the solvent. Many water-soluble alcohol, glycols, phenols, aldehydes, ketones and ethers are well suited for this purpose; for example: methyl and ethyl alcohols, normal or iso-propyl alcohols, butyl and amyl alcohols, allyl alcohol, ethylene glycol, methyl ethyl ketone, methyl ethyl ether, acetaldehyde, etc. as well as the halogen-substituted derivatives of all of the above compounds. Such of the above listed compounds as ketones having less than 6 carbon atoms, for example, acetone, methyl ethyl ketone, methyl propyl ketone and methyl butyl ketone, which have excellent solvent powers for the organic components of the obstructing deposits, are especially suitable for the purposes of this invention. While the use of an aqueous acid and of an organic solvent immiscible therewith is essential to the method of the present invention, the use of a third mutually soluble agent in the treating liquid is often very advantageous in avoiding the necessity of agitating the latter at the bottom of the hole and in intensifying the combined action of the acid and of the immiscible solvent on the obstructing mineral-organic deposits.

Data obtained in treating samples of gyp in the same manner as above described, but using a three-component agent, are given in the following table.

TABLE II

Rate of reaction of gyp deposits with three-component agents

| Reagent | | | | Time in seconds | $CO_2$ evolved in c. c. |
|---|---|---|---|---|---|
| Acid | Quantity c. c. | Solvent | Quantity c. c. | | |
| 15% HCL | 25 | 66% gasoline, 33% methyl ethyl ketone. | 25 | 10 | 145 |
| 15% HCL | 25 | | 25 | 20 | 325 |
| 15% HCL | 25 | | 25 | 30 | 445 |
| 15% HCL | 25 | | 25 | 40 | 525 |
| 15% HCL | 25 | | 25 | 50 | 595 |
| 15% HCL | 25 | 66% gasoline, 33% methyl butyl ketone. | 25 | 10 | 275 |
| 15% HCL | 25 | | 25 | 20 | 430 |
| 15% HCL | 25 | | 25 | 30 | 540 |

Since the effect of the treating agent on gyp deposits varies considerably with the particular nature of these deposits it is highly advantageous to determine in advance the particular composition of the treating agent to be used for a particular well. This may be easily done by preliminary laboratory tests with samples of gyp deposits obtained from such well. In this manner, it is possible to determine whether the best results will be obtained by using, for example, one part of 15% hydrochloric acid and one part of solvent comprising 50% of benzol and 50% of methyl ethyl ketone, or one part of 15% hydrochloric and two parts of solvent comprising 75% of gasoline and 25% of methyl propyl ketone, etc. In this manner a mixture best adapted to react with gyp deposits of a particular nature having a definite proportion of mineral and organic components, can always be correctly selected.

I claim as my invention:

1. In the process of treating wells for the removal of deposits consisting of mineral and organic matter, the step of introducing thereinto a liquid comprising an aqueous acid capable of reacting with said mineral matter, and a water-insoluble solvent capable of dissolving said organic matter.

2. In the process of treating wells for the removal of deposits consisting of mineral and organic matter, the step of introducing thereinto a liquid comprising an aqueous acid capable of reacting with said mineral matter, a water-insoluble solvent capable of dissolving said organic matter, and a second solvent soluble in the acid and in said first solvent.

3. The process of claim 2, wherein the soluble solvent is a ketone having less than 6 carbon atoms in the molecule.

4. The process of claim 2, wherein the soluble solvent is methyl-ethyl-ketone.

5. In the process of treating wells for the removal of deposits consisting of mixed mineral and organic matter, the steps of introducing thereinto a liquid comprising an aqueous acid capable of reacting with said mineral matter and a water-insoluble solvent capable of dissolving said organic matter, the amount of the solvent used being at least equal to that of the acid, and subjecting said deposits to the simultaneous action of said acid and of said solvent.

6. In the process of claim 5, using hydrochloric acid and benzol.

7. In the process of claim 5, using a liquid comprising one part of hydrochloric acid of 15% concentration, and one part of benzol.

8. In the process of claim 5, using hydrochloric acid and gasoline.

9. In the process of claim 5, using a liquid comprising one part of hydrochloric acid of 15% concentration and one part of gasoline.

ALBERT G. LOOMIS.
HAROLD T. BYCK.
JAMES F. FIDIAM, Jr.